United States Patent
Barger et al.

(10) Patent No.: US 11,535,744 B2
(45) Date of Patent: Dec. 27, 2022

(54) AMORPHOUS POLYESTER COMPOSITION AND METHOD OF MAKING

(71) Applicant: DDP SPECIALTY ELECTRONIC MATERIALS, LLC., Wilmington, DE (US)

(72) Inventors: Mark Alan Barger, Midland, MI (US); Stephane Costeux, Midland, MI (US); Michal Elizabeth Porter, Midland, MI (US); Patrick Heider, Midland, MI (US)

(73) Assignee: DDP SPECIALTY ELECTRONIC MATERIALS US, LLC., Wilmington, DE (US)

( * ) Notice: Subject to any disclaimer, the term of this patent is extended or adjusted under 35 U.S.C. 154(b) by 270 days.

(21) Appl. No.: 16/832,168

(22) Filed: Mar. 27, 2020

(65) Prior Publication Data
US 2020/0308396 A1    Oct. 1, 2020

Related U.S. Application Data

(60) Provisional application No. 62/826,153, filed on Mar. 29, 2019.

(51) Int. Cl.
| | |
|---|---|
| *C08G 63/42* | (2006.01) |
| *C08L 67/03* | (2006.01) |
| *C08G 63/183* | (2006.01) |
| *C08G 63/78* | (2006.01) |
| *C08G 63/84* | (2006.01) |
| *C08G 63/85* | (2006.01) |
| *C08G 63/91* | (2006.01) |
| *C08J 9/228* | (2006.01) |
| *C08L 67/04* | (2006.01) |
| *C08J 9/12* | (2006.01) |
| *C08J 9/14* | (2006.01) |

(52) U.S. Cl.
CPC ............ *C08L 67/03* (2013.01); *C08G 63/183* (2013.01); *C08G 63/42* (2013.01); *C08G 63/785* (2013.01); *C08G 63/84* (2013.01); *C08G 63/85* (2013.01); *C08G 63/916* (2013.01); *C08J 9/228* (2013.01); *C08L 67/04* (2013.01); *C08G 2110/0058* (2021.01); *C08G 2250/00* (2013.01); *C08J 9/122* (2013.01); *C08J 9/125* (2013.01); *C08J 9/141* (2013.01); *C08J 2201/03* (2013.01); *C08J 2367/03* (2013.01); *C08J 2367/04* (2013.01)

(58) Field of Classification Search
USPC .......................... 525/437; 528/190, 193, 194
See application file for complete search history.

(56) References Cited

U.S. PATENT DOCUMENTS

| | | | |
|---|---|---|---|
| 3,470,114 A | 9/1969 | Siggel et al. | |
| 4,462,947 A | 7/1984 | Huggard | |
| 4,466,933 A | 8/1984 | Huggard | |
| 4,544,677 A | 10/1985 | Allen et al. | |
| 5,475,037 A | 12/1995 | Park et al. | |
| 6,020,393 A | 2/2000 | Chand | |
| 6,214,897 B1 | 4/2001 | Tung et al. | |
| 6,306,921 B1 | 10/2001 | Al Ghatta et al. | |
| 9,249,270 B2 | 2/2016 | Sampath et al. | |
| 2007/0010650 A1* | 1/2007 | Crawford | B65D 23/10 528/302 |
| 2015/0322200 A1* | 11/2015 | Asthana | C08G 63/185 525/425 |

FOREIGN PATENT DOCUMENTS

| | | |
|---|---|---|
| EP | 2736930 B1 | 4/2016 |
| WO | 2013/033285 A1 | 3/2013 |

OTHER PUBLICATIONS

Fiorini, M. "Reactive blending of poly(ethylene terephthalate) and bisphenol-A polycarbonate: effect of various catalysts and mixing time on the extent of exchange reactions", Polymer, vol. 38, Issue 2, Jan. 1997, pp. 413-419.
International Search Report and Written Opinion issued in International Application No. PCT/US2020/025193, dated Jan. 7, 2020.

* cited by examiner

*Primary Examiner* — Terressa Boykin

(57) ABSTRACT

An amorphous polyester or copolyester composition comprises the reaction product of a crystalline or semicrystalline polyester or copolyester, optionally derived from a recycled waste stream, at least one diol or aromatic diacid or an ester of a diacid or a hydroxycarboxylic acid or a lactone or a dianhydride, and a catalyst, wherein the amorphous composition has a weight average molecular weight of at least 10,000 g/mol (polystyrene equivalent molecular weight) as measured by gel permeation chromatography.

15 Claims, No Drawings

AMORPHOUS POLYESTER COMPOSITION AND METHOD OF MAKING

FIELD OF THE INVENTION

Described herein is a composition and method for making an amorphous polyester composition that can be converted into low density foam suitable for use as an insulating material for buildings and other industrial applications.

BACKGROUND OF THE INVENTION

Crystalline and semicrystalline polyester polymers cannot be readily foamed to produce a low density foam because their crystalline or semicrystalline nature means that high temperatures are required to keep the material from recrystallizing while trapped gases expand and produce a foam. In the melted state, above its recrystallization temperature, the viscosity and melt strength of semicrystalline polyesters, such as PET, are too low to allow for significant expansion of cells prior to hardening. This limits the foam density which can be achieved (limiting to higher density foams, for example, characterized by a density greater than 96 kg/m$^3$ (6 pcf)). The present invention solves the problem of foaming crystalline or semicrystalline polyesters to produce low density foams by converting the crystalline or semicrystalline polyester, such as polyethylene terephthalate (PET), into an amorphous copolyester polymer material capable of producing a low density foam from the polymer melt or from extruded, expandable beads containing appropriate blowing agents.

In the production of a foamable polyester or copolyester derived from semicrystalline PET the starting material can be sourced either as virgin material or from a 'recycled' waste stream such as from PET bottles and other post-consumer PET sources. For the purposes of this invention, 'recycled' refers to both post-consumer and post-industrial sourced materials. Accordingly, one particularly desirable objective would be to utilize recycled semicrystalline PET and convert it to an amorphous, not readily crystallizable polymer that can be foamed to produce low density foams. Therefore, there is a need for foamable compositions containing amorphous polymers derived from crystalline or semicrystalline polyesters, either virgin or recycled, methods for preparing the amorphous polymers and foamable compositions, and methods for using them. The invention is directed to these, as well as other, important ends.

SUMMARY OF THE INVENTION

An amorphous polyester or copolyester composition comprises the reaction product of a crystalline or semicrystalline polyester or copolyester, optionally derived from a recycled waste stream, at least one diol or aromatic diacid or an ester of a diacid or a hydroxycarboxylic acid or a lactone or a dianhydride, and a catalyst, wherein the amorphous composition has a weight average molecular weight of at least 10,000 g/mol (polystyrene equivalent molecular weight) as measured by gel permeation chromatography.

A method of making an amorphous polyester resin as herein described comprises the steps of:
  combining at room temperature in a reactor, a crystalline or semi-crystalline polyester, optionally derived from a recycled waste stream, with at least one diol or aromatic diacid or an ester of a diacid or a hydroxy-carboxylic acid or a lactone or a dianhydride, and in the presence of a catalyst,
  sealing and purging the reactor with an inert gas,
  mixing the contents,
  evacuating the reactor of volatile components,
  flushing the reactor at least once with an inert gas,
  increasing the temperature of the reactor to between 250-350° C. over a period of from 30 to 90 minutes,
  mixing the molten material combination,
  maintaining a temperature of between 250-350° C.,
  evacuating the reactor to minus 25 inches of mercury or lower,
  continuing the reaction at a temperature of from 250-350° C., for between 100 to 300 minutes, optionally while removing volatile species via a distillation column, and
  stopping the reaction by ceasing mixing, purging the reactor with an inert gas, returning the reactor to atmospheric pressure and reducing the temperature to 100 degrees C. or lower, wherein the resultant composition has a weight average molecular weight of at least 10,000 g/mol (polystyrene equivalent molecular weight) as measured by gel permeation chromatography) and a degree of crystallinity no greater than 5% as determined by differential scanning calorimetry.

DETAILED DESCRIPTION OF THE INVENTION

In the case of semi-crystalline PET, where the polymer consists essentially of ethylene terephthalate repeat units, foaming must take place above the crystallization temperature. For PET, this temperature typically lies between the normal melting point (~250° C.) and the onset temperature for crystallization of PET upon cooling from a molten state (approximately 150° C.), where both temperatures are determined by differential scanning calorimetry (DSC) at heating and cooling rates of 10° C./min. At such elevated temperatures, molten PET has very low melt strength and can be only minimally expanded before crystallization-induced vitrification sets in. As disclosed herein, PET (virgin or recycled) is rendered into an amorphous, not readily crystallizable form. The elimination of crystallization allows melt processing of the polymer below 150° C., where both the melt strength and viscosity are higher. This facilitates cellular expansion and limits cell coalescence, enabling the preparation of a low density foamed product. However, although the elimination of crystallinity in the polymer's neat form is required, it is not sufficient for foamability. Addition of one or more soluble blowing agents will increase crystallization rates. It is further disclosed herein specifically the types of polymer chain structures that are required to sufficiently reduce the crystallization rate in the presence of such blowing agents (such as, for example, carbon dioxide) to facilitate foaming. This is a required attribute for the polymer to be suitably foamable at temperatures below 150° C. in order to achieve densities less than 96 kg/m$^3$ (6pcf), more preferably densities less than 80 kg/m$^3$ (5pcf), and even more preferably densities below 40 kg/m$^3$ 2.5 (pcf).

Unlike semi-crystalline PET, which is known to have poor solubility for typical blowing agents, the inventive process modifies PET to yield an amorphous polymer with a higher solubility for typical blowing agents and allows for the preparation of low density foam articles. Preventing the formation of crystalline structures also increases gas permeability rates, which is advantageous for cellular growth during the foaming process.

Both virgin and recycled PET can be rendered useful for foaming through reduction or elimination of its ability to crystallize in the presence of heat and/or dissolved gas. This is accomplished through direct transesterification of molten PET with one or more monomers in the presence of a catalyst to promote rearrangement of the type and sequencing of repeat units contained within the polymers to form a new random co-polyester. The new monomer components can include organic esters, diols, diacids, di-anhydrides, hydroxycarboxylic acids, or lactones. The composition may include a polyol, a polyacid, or a polyanhydride, or other multifunctional species aimed at introducing long chain branching. Since esterification is an equilibrium reaction, water or an alcohol or ethylene glycol may need to be continuously removed in order to drive the transesterification reaction to high conversion. Through appropriate choice of reaction conditions, such as catalyst, temperature, reaction time and application of vacuum, the resulting polymer has a sufficiently slow crystallization rate. This reduction or elimination of crystallization allows processing at temperatures below 150° C. (the typical crystallization onset temperature of the starting PET material). The final co-polyester can be melt blended with physical blowing agents and expanded via extrusion foaming or rapidly cooled and pelletized to form a bead for subsequent expansion.

The term "polyester" herein designates polymers of which the repeat units are characterized by an ester group in the backbone of the polymer. The term therefore comprises not only typical polyesters prepared from one diacid component and of one dihydroxy component, but also an ester of a diacid, or a hydroxycarboxylic acid, lactone based polyesters, or a dianhydride as well as copolymers, i.e. polyesters ("copolyesters") composed of at least two acid components and/or alcohol components, and/or hydroxycarboxylic acid components and/or lactone components. The term "copolyesters" is a subset of polyesters.

As used herein, the term "foam" means a low density matrix of fluid or solid containing a plurality of subdivided voids or bubbles. The foam may be closed cell or open cell, these terms being well known in the art. Herein, depending on context, the term can be referring to the initial foam formed from the molten polymer, or it can be used to describe the final, solidified foam. With respect to determining whether a sample could be successfully foamed (a "foamable resin" or a "foamable composition"), the initial or molten sample must be frothed (by certain method and/or under certain conditions) and be capable of forming a stable foam. The foam article can further comprise one or more additives in any combination. Exemplary additives include infrared attenuating agents (for example, carbon black, graphite, metal flake, titanium dioxide); clays such as natural absorbent clays (for example, kaolinite and montmorillonite) and synthetic clays; nucleating agents (for example, talc and magnesium silicate); flame retardants (for example, brominated flame retardants such as hexabromocyclododecane and brominated polymers and copolymers, phosphorous flame retardants such as triphenylphosphate, and flame retardant packages that may including synergists such as, for example, dicumyl and polycumyl); lubricants (for example, calcium stearate and barium stearate); and acid scavengers (for example, magnesium oxide and tetrasodium pyrophosphate). Preferably, the thermoplastic polymer foam article comprises infrared attenuating agents to Minimize thermal conductivity through the article. Additives are typically dispersed within the polymer matrix, generally within the continuous thermoplastic polymer phase, and are present at a concentration of up to 15 weight % based on total polymer weight in the polymeric foam article, As used herein, "stable foam" refers to a foam that is stable with respect to observable shrinking or collapse during the solidification process and beyond in the absence of any external force other than the surrounding atmosphere.

As used herein, the term "rigid foam" refers to a solidified foam that that has a cellular structure with a compressive strength greater than 5 psi.

All molecular weights and other values associated with molecular weights (e.g., polydispersity index, etc.) disclosed herein are measured by GPC.

As used herein, the term "number average molecular weight" ($M_n$, or $\overline{M}_n$) refers to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ may be determined for polymers by methods well known to a person having ordinary skill in the art using molecular weight standards, e.g., polystyrene standards, preferably certified or traceable molecular weight standards.

As used herein, the term "weight-average molecular weight" (Mw, or $\overline{M}$w) is defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ considers the molecular weight of a given chain in determining contributions to the molecular weight-average. Thus, the greater the molecular weight of a given chain, the more the chain contributes to the $M_w$. $M_w$ may be determined for polymers, e.g., polystyrene polymers, by methods well known to a person having ordinary skill in the art using molecular weight standards, e.g., polystyrene standards or poly(methyl methacrylate) standards, preferably certified or traceable molecular weight standards.

Amorphous Polyester or Copolyester Resin

An amorphous polyester or copolyester composition comprises a reaction product of:
  a crystalline or semi-crystalline polyester or copolyester, optionally derived from a recycled waste stream,
  at least one diol or aromatic diacid, or an ester of a diacid or a hydroxycarboxylic acid or a lactone or a dianhydride, and a catalyst,
  wherein the amorphous polymer reaction product has a weight average molecular weight of at least 10,000 g/mol (polystyrene equivalent molecular weight) as measured by gel permeation chromatography.

In some embodiments, the polyester is polyethylene terephthalate, polyethylene terephthalate glycol, or a polyester where the main diol component is ethylene glycol, propylene glycol, 1,4-butane diol, spiroglycol or blends thereof.

In some embodiments, the at least one aromatic diacid monomer is phthalic acid, terephthalic acid, isophthalic acid, or 2,5-furandicarboxylic acid, or combination thereof.

In some embodiments, the at least one diol is isosorbide, cyclohexane dimethanol, or cyclobutane diol. In some such embodiments, the cyclohexane dimethanol is 1,4-cyclohexane dimethanol present in an amount of from 20 to 40 mol % of total diol content; the isosorbide is present in an amount of from 15 to 100 mol % of total diol content; the cyclobutanediol is 2-2-4-4-tetramethyl-1-3-cyclobutanediol present in an amount of from 45 to 55 mol % of total diol content.

In an embodiment, the cyclohexane dimethanol is 1,3 cyclohexane dimethanol, 1,4 cyclohexane dimethanol or blends thereof present in an amount of from 20 to 30 mol % when combined with isophthalic acid present in an amount of from 20 to 30 mol %.

Suitable catalysts for the transesterification reaction include those known in the art, particularly organometallic complexes such as, for example, titanium tetrabutoxide, $Ti(OBu)_4$, cerium(III) acetate, $Ce(OAc)_3$, tetra isopropyl titanate as well as tin-based organometallic complexes available under the tradename FASCAT® Catalysts (PMC Organometallics, Mount Laurel, N.J., USA). A preferred catalyst is antimony trioxide. Suitable levels of use may vary from one catalyst to the next, but generally are in the range of from 50 ppm to 10,000 ppm, or from 1,000 ppm to 5,000 ppm, or from 1,500 ppm to 3,000 ppm (parts of catalyst, by weight, per million parts of total polymers present in the reaction.

Preferably, the amorphous resin has a degree of crystallinity no greater than 5%, or even no greater than 1%, a maximum heat of melting of less than 7 J/g or even less than 1 J/g. The resin also has a glass transition temperature (Tg) of at least 75° C., or at least 85° C., or at least 90° C., or at least 100° C., or at least 110° C.

Method of Making an Amorphous Polyester or Copolyester Resin

A method of making an amorphous polyester resin as herein described comprises the steps of:

combining at room temperature in a reactor, a crystalline or semi-crystalline polyester, optionally derived from a recycled waste stream, with at least one diol or aromatic diacid or an ester of a diacid or a hydroxy-carboxylic acid or a lactone or a dianhydride, and in the presence of a catalyst, sealing and purging the reactor with an inert gas,
mixing the contents,
evacuating the reactor of volatile components,
flushing the reactor at least once with an inert gas,
increasing the temperature of the reactor to between 250-350° C., such as from 280-290 or from 283-287° C., over a period of from 30 to 90 minutes, such as from 50 to 70 minutes, or from 55-65 minutes or even 58-63 minutes, mixing the molten material combination, for example, at a rate of from 100-200 rpm, maintaining a temperature of between 250-350° C., such as 280-290° C., or 283-287° C. for a hold time of between 20 to 200 minutes, or from 20 to 150 minutes or from 40 to 100 minutes, evacuating the reactor to minus 25 inches of mercury or lower, continuing the reaction at a temperature of from 250-350° C., or 280-290° C., or 283-287° C. for between 100 to 300 minutes or from 200 to 220 minutes, for 208 to 212 minutes, optionally while removing volatile species, for example, via a distillation column, and stopping the reaction by ceasing mixing, purging the reactor with an inert gas, returning the reactor to atmospheric pressure and reducing the temperature to 100 degrees C. or lower, wherein the resultant composition has a weight average molecular weight of at least 10,000 g/mol (polystyrene equivalent molecular weight as measured by gel permeation chromatography) and a degree of crystallinity no greater than 5%, or no greater than 1%, as determined by differential scanning calorimetry.

In some embodiments, the hold time is from 40-50 minutes or even 43-47 minutes. In other embodiments, the hold time is from 80-100 minutes, more preferably 85-95 minutes, or most preferably 87-93 minutes.

An alternative method of making an amorphous polyester resin comprises the steps of:

combining at room temperature in a reactor, a crystalline or semi-crystalline polyester, optionally derived from a recycled waste stream, with at least one diol or aromatic diacid or an ester of a diacid or a hydroxycarboxylic acid or a lactone or a dianhydride, and in the presence of a catalyst, sealing and purging the reactor with an inert gas,
mixing the contents,
evacuating the reactor of volatile components,
flushing the reactor at least once with an inert gas,
increasing the temperature of the reactor to between 250-350° C. or 280-290° C., or 283-287° C. over a period of from 30 to 90 minutes, or 50 to 70 minutes, preferably 55-65 minutes or even 58-63 minutes, mixing the molten material combination, for example, at a rate of from 100-200 rpm, maintaining a temperature of between 250-350° C. or 280-290° C., preferably 283-287° C. for a hold time of between 20 to 150 minutes or 40 to 100 minutes, evacuating the reactor to minus 25 inches of mercury or lower, continuing the reaction at a temperature of from 250-350° C. or 280-290° C., preferably 283-287° C. for between 100 to 300 minutes, or 200 to 220 minutes, preferably 208-212 minutes, optionally while removing volatile species, for example, via a distillation column, stopping the reaction by discontinuing mixing, purging the reactor with an inert gas, returning the reactor to atmospheric pressure and, transferring the molten or optionally solidified product to a continuous melt processing device such as a single or twin-screw extruder, the melt processing device being capable of heating, mixing, and exposing the molten product to reduced pressure so as to remove volatile species and maintain the product in a molten state.

The resultant composition has a weight average molecular weight of at least 10,000 g/mol (polystyrene equivalent molecular weight as measured by gel permeation chromatography) and a degree of crystallinity no greater than 5%, or no greater than 1° A, as determined by differential scanning calorimetry.

In some embodiments, in addition to the polyester resin product, a second polymeric species can be added to the melt processing device.

Some embodiments disclosed herein are set forth in the claims, and any combination of these embodiments (or portions thereof) may be made to define an embodiment.

Foamable Composition

In an embodiment, there is provided a foamable composition comprising the amorphous polyester or copolyester resin as described above and one or more blowing agents. In certain embodiments, the blowing agent is selected from one or more physical blowing agents, such as pentane hydrocarbons, hydrofluoroolefins, carbon dioxide, nitrogen, oxygen, water, alcohols such as methanol and ethanol, ketones including acetone, ethers such as dimethyl ether or diethyl ether, halogenated hydrocarbons such as ethylene chloride or methylene chloride, or olefins such as pentene, or a combination thereof. Examples of suitable chemical blowing agents are azides such as azodicarbonamide (AZNP), 5-phenyl tetrazole (5PT), or a mixture of citric acid and bicarbonate salts.

Solid Foamable Bead

In another embodiment of the invention, there is provided a solid foamable bead made from the foamable compositions disclosed herein.

Foamed Article

Further, the invention provides a foamed article comprising the foamable composition described above, the article being made by either: (a) extrusion foaming of any of the foamable compositions, or (b) bead expansion of the solid foamable bead described above. Extrusion foaming and bead expansion are terms well known in the foamed article art. In some embodiments, the foamed article has a density no greater than 96 kg/m$^3$ (6 pcf), or no greater than 80 kg/m$^3$ (5 pcf), or no greater than 40 kg/m$^3$ (2.5 pcf).

Test Methods

Differential Scanning calorimetry (DSC) Method A: A sample was heated at a rate of 10° C./min from 30° C. to 300° C. under a nitrogen environment, then cooled at 10° C./min back down to 30° C. The sample was then heated a second time at 10° C./min from 30° C. to 300° C. The second heat up scan was used to measure the glass transition temperature (Tg) and any heat of melting (Tm) associated with crystallinity. Inflection point was used to designate the Tg. Tm was determined by integrating any area representing baseline deviation from 175° C. to 225° C. This method was used for all examples, both before and after attempting foaming.

Gel Permeation Chromatography (GPC) Method B: Samples were dissolved in hexaflouroisopropanol (HFIP) at 40 mg/ml. After shaking at room temperature for 24 hours, samples were dissolved completely in the HFIP. Once dissolved in HFIP, samples were diluted down to 2 mg/ml with chloroform and filtered through 0.2 um PTFE filters. Samples were then run through a pair of Mixed C GPC columns at 1 ml/min in a chloroform mobile phase. Injection volume was 50 microliters and temperature was held at 35° C. UV (263 nm) and IR detectors were used for detection, and a series of polystyrene (PS) molecular weight standards were used for molecular weight calibration. All molecular weights reported are PS equivalent molecular weights.

Foam Density Measurement: This was determined according to ASTM method D-1622-03.

Foamability Assessment Method C: To assess foamability of comparative and inventive examples, a sample was compression molded into a 1.3 mm thick film (25 tons of pressure at 180° C. for 5 minutes). A portion of the pressed film (approximately 7 mm×7 mm in area) was placed in a pressure vessel which was preheated to 125° C. The vessel was then pressurized to 1000 psi using carbon dioxide, and the sample allowed to soak for 3-4 hours to allow dissolution of the gas into the polymer. The pressure was then rapidly released to induce foaming in the sample. Successful foaming was determined by the visual observation of void formation in the polymer sample and corresponding increase in sample volume by at least 50%.

EXAMPLES

Comparative Example A

Semi-crystalline PET (Certene 8080 as supplied by Muehlstein) was pressed into a film and tested for foamability using the method described above except that the pressing temperature was 280° C. Upon depressurization, the sample did not increase in volume and was observed to be very opaque white in appearance. DSC of the sample was found to contain a substantial melting peak (>20 J/g) indicating a degree of crystallinity.

Comparative Example B

Amorphous PET (Altester 45 as supplied by Mitsubishi Gas Chemical) was pressed into a film and tested for foamability using the method described above except that only 800 psi of $CO_2$ was utilized and the soaking time was 12 hours. Upon depressurization, the sample was not observed to increase in volume and had a very opaque white appearance. DSC of the sample was found to contain a substantial melting peak (>20 J/g heat of melting).

Example 1: Reaction of Polyester with Cyclohexane Dimethanol and Terephthalic Acid Virgin poly(ethylene terephthalate) as supplied by Muehlstein, (10 g) was added at room temperature to a 100 ml glass reactor. Next, a quantity of 3.7 g terephthalic acid (supplied by Sigma Aldrich), 3.3 g of cyclohexane dimethanol (supplied by Sigma Aldrich), and 0.013 g of antimony trioxide (supplied by Sigma Aldrich) was added to the reactor. The reactor was sealed and purged with nitrogen for approximately 20 minutes. A glass stirrer was used to mix the contents of the reactor via overhead mixing at approximately 150 rpm. The headspace of the reactor was then evacuated to −28.9" Hg and refilled with nitrogen for three cycles. The contents of the reactor were then gradually heated to 285° C. under nitrogen over a period of approximately 1 hour. The contents were held at 285° C. for an additional 90 minutes. The pressure inside the vessel was then reduced by pulling vacuum, reaching −28.8" Hg. The reaction was continued at 285° C. for approximately 3.5 hours under vacuum. Volatile species were collected by a short path distillation column and condenser flask which was cooled by dry ice. To stop the reaction, stirring and heating was discontinued and the reactor was purged with nitrogen to return to atmospheric pressure. The contents were cooled down overnight to ambient temperature (nominally 20-25 degrees C.). Final mole % cyclohexane dimethanol (relative to total diol content) was 30%.

Differential scanning calorimetry (DSC) was run on the final product, showing no presence of crystallinity and a Tg of 79° C.

To assess foamability, a sample was pressed into a film and tested for foamability using the method described above. The sample expanded in volume and showed evidence of pore formation, indicating successful foaming. DSC was run on the post-foamed material and no evidence of crystallinity was detected as a heat of melting peak present in the first heat up scan of the sample.

Example 2: Reaction of Polyester with Cyclohexane Dimethanol

Virgin poly(ethylene terephthalate) as supplied by Muehlstein (10 g) was added at room temperature to a 100 ml glass reactor. Next, a quantity of 2.3 g of cyclohexane dimethanol (supplied by Sigma Aldrich), and 0.012 g of antimony trioxide (supplied by Sigma Aldrich) was added to the reactor. The reactor was sealed and purged with nitrogen for approximately 20 minutes. A glass stirrer was used to mix the contents of the reactor via overhead mixing at approximately 150 rpm. The headspace of the reactor was then evacuated to −28.6" Hg and refilled with nitrogen for three cycles. The contents of the reactor were then gradually heated to 285° C. under nitrogen over a period of approximately 1 hour. The contents were held at 285° C. for an additional 90 minutes. The pressure inside the vessel was then reduced by pulling vacuum, reaching −28.5" Hg. The reaction was continued at 285° C. for approximately 3.5 hours under vacuum. Volatile species were collected by a short path distillation column and condenser flask which was cooled by dry ice. To stop the reaction, stirring and heating was discontinued and the reactor was purged with nitrogen to return to atmospheric pressure. The contents were cooled down overnight to ambient temperature (nominally 20-25 degrees C.). The final targeted mole % cyclohexane dimethanol (relative to total diol content) was 30%.

Differential scanning calorimetry (DSC) was run on the final product, showing no presence of crystallinity and a Tg of 76° C.

Example 3: Reaction of Polyester with Isosorbide and Terephthalic Acid

Virgin poly(ethylene terephthalate) as supplied by Muehlstein (10 g) was added at room temperature to a 100 ml glass reactor. Next, a quantity of 2.85 g terephthalic acid (supplied by Sigma Aldrich), 2.55 g of isosorbide (supplied by Sigma Aldrich), and 0.014 g of antimony trioxide (supplied by Sigma Aldrich) was added to the reactor. The reactor was sealed and purged with nitrogen for approximately 20 minutes. A glass stirrer was used to mix the contents of the reactor via overhead mixing at approximately 150 rpm. The headspace of the reactor was then evacuated to −28.6" Hg and refilled with nitrogen for three cycles. The contents of the reactor were then gradually heated to 285° C. under nitrogen over a period of approximately 1 hour. The contents were held at 285° C. for an additional 90 minutes. The pressure inside the vessel was then reduced by pulling vacuum, reaching −28.6" Hg. The reaction was continued at 285° C. for approximately 3.5 hours under vacuum. Volatile species were collected by a short path distillation column and condenser flask which was cooled by dry ice. To stop the reaction, stirring and heating was discontinued and the reactor was purged with nitrogen to return to atmospheric pressure. The contents were cooled down overnight to ambient temperature (nominally 20-25 degrees C.). Final mole % isosorbide (relative to total diol content) was 25%.

DSC was run on the final product prior to any attempted foaming, showing no presence of crystallinity and a Tg of 107° C.

Example 4: Reaction of Polyester with Isosorbide

Virgin poly(ethylene terephthalate) as supplied by Muehlstein (15 g) was added at room temperature to a 100 ml glass reactor. Next, a quantity of 2.9 g of isosorbide (supplied by Sigma Aldrich), and 0.02 g of antimony trioxide (supplied by Sigma Aldrich) was added to the reactor. The reactor was sealed and purged with nitrogen for approximately 20 minutes. A glass stirrer was used to mix the contents of the reactor via overhead mixing at ~150 rpm. The headspace of the reactor was then evacuated to −28.8" Hg and refilled with nitrogen for three cycles. The contents of the reactor were then gradually heated to 285° C. under nitrogen over a period of approximately 1 hour. The contents were held at 285° C. for an additional 90 minutes. The pressure inside the vessel was then reduced by pulling vacuum, reaching −28.7" Hg. The reaction was continued at 285° C. for approximately 3.5 hours under vacuum. Volatile species were collected by a short path distillation column and condenser flask which was cooled by dry ice. To stop the reaction, stirring and heating was discontinued and the reactor was purged with nitrogen to return to atmospheric pressure. The contents were cooled down overnight to ambient temperature (nominally 20-25° C.). The final targeted mole % isosorbide (relative to total diol content) was 25%.

DSC was run on the final product prior to any attempted foaming, showing no presence of crystallinity and a Tg of 97° C.

Example 5: Reaction of Polyester with Cyclobutane Diol and Terephthalic Acid Virgin poly(ethylene terephthalate) as supplied by Muehlstein (6 g) was added at room temperature to a 100 ml glass reactor. Next, a quantity of 4.6 g terephthalic acid (supplied by Sigma Aldrich), 5.2 g of cyclobutane diol (supplied by Sigma Aldrich), and 0.018 g of antimony trioxide (supplied by Sigma Aldrich) was added to the reactor. The reactor was sealed and purged with nitrogen for approximately 20 minutes. A glass stirrer was used to mix the contents of the reactor via overhead mixing at approximately 150 rpm. The headspace of the reactor was then evacuated to −28.9" Hg and refilled with nitrogen for three cycles. The contents of the reactor were then gradually heated to 285° C. under nitrogen over a period of approximately 1 hour. The contents were held at 285° C. for an additional 90 minutes. The pressure inside the vessel was then reduced by pulling vacuum, reaching −29" Hg. The reaction was continued at 285° C. for approximately 3.5 hours under vacuum. Volatile species were collected by a short path distillation column and condenser flask which was cooled by dry ice. To stop the reaction, stirring and heating was discontinued and the reactor was purged with nitrogen to return to atmospheric pressure. The contents were cooled down overnight to ambient temperature (nominally 20-25° C.). Final mole % cyclobutane diol (relative to total diol content) was 50%.

DSC was run on the product before any attempted foaming, showing no presence of crystallinity and a Tg of 107° C.

To assess foamability, a sample was pressed into a film and tested for foamability using the method described above. The sample showed evidence of pore formation, indicating successful foaming. DSC was run on the post-foamed material and no evidence of crystallinity was detected as a heat of melting peak present in the first heat up scan of the sample.

Example 6: Reaction of Recycled Polyester with Cyclohexane Dimethanol and Terephthalic Acid Recycled polyester was obtained from Clean Tech Recyclers (Dundee, Mich.) in the form of clear pellets. Recycled PET (10 g) was added at room temperature to a 100 ml glass reactor. Next, a quantity of 3.8 g terephthalic acid (supplied by Sigma Aldrich), 3.4 g of cyclohexane dimethanol (supplied by Sigma Aldrich), and 0.013 g of antimony trioxide (supplied by Sigma Aldrich) was added to the reactor. The reactor was sealed and purged with nitrogen for approximately 20 minutes. A glass stirrer was used to mix the contents of the reactor via overhead mixing at approximately 150 rpm. The headspace of the reactor was then evacuated to −28.7" Hg and refilled with nitrogen for three cycles. The contents of the reactor were then gradually heated to 285° C. under nitrogen over a period of approximately 1 hour. The contents were held at 285° C. for an additional 90 minutes. The pressure inside the vessel was then reduced by pulling vacuum, reaching −28.8" Hg. The reaction was continued at 285 degrees C. for approximately 3.5 hours under vacuum. Volatile species were collected by a short path distillation column and condenser flask which was cooled by dry ice. To stop the reaction, stirring and heating was discontinued and the reactor was purged with nitrogen to return to atmospheric pressure. The contents were cooled down overnight to ambient temperature (nominally 20-25 degrees C.). Final mole % cyclohexane dimethanol (relative to total diol content) was 30%.

Differential scanning calorimetry (DSC) was run on the final product, showing no presence of crystallinity and a Tg of 79° C.

To assess foamability, a sample was pressed into a film and tested for foamability using the method described above. The sample showed evidence of pore formation, indicating successful foaming. DSC was run on the post-foamed material and no evidence of crystallinity was detected as a heat of melting peak present in the first heat up scan of the sample.

Example 7: Reaction of Recycled Polyester with Isosorbide and Terephthalic Acid Recycled polyester was obtained from Clean Tech Recyclers (Dundee, Mich.) in the form of clear pellets. Recycled PET (10 g) was added at room temperature to a 100 ml glass reactor. Next, a quantity of 2.87 g terephthalic acid (supplied by Sigma Aldrich), 2.57 g of isosorbide (supplied by Sigma Aldrich), and 0.016 g of antimony trioxide (supplied by Sigma Aldrich) was added to the reactor. The reactor was sealed and purged with nitrogen for approximately 20 minutes. A glass stirrer was used to mix the contents of the reactor via overhead mixing at approximately 150 rpm. The headspace of the reactor was then evacuated to −28.8" Hg and refilled with nitrogen for three cycles. The contents of the reactor were then gradually heated to 285° C. under nitrogen over a period of approximately 1 hour. The contents were held at 285° C. for an additional 90 minutes. The pressure inside the vessel was then reduced by pulling vacuum, reaching −28.9" Hg. The reaction was continued for approximately 3.5 hours under vacuum. Volatile species were collected by a short path distillation column and condenser flask which was cooled by dry ice. To stop the reaction, stirring and heating was discontinued and the reactor was purged with nitrogen to return to atmospheric pressure. The contents were cooled down overnight to ambient temperature (nominally 20-25 degrees C.). Final mole % isosorbide (relative to total diol content) was 25%.

DSC was run on the final product prior to any attempted foaming, showing no presence of crystallinity and a Tg of 106° C.

To assess foamability, a sample was pressed into a film and tested for foamability using the method described above. The sample showed evidence of pore formation, indicating successful foaming. DSC was run on the post-foamed material and no evidence of crystallinity was detected as a heat of melting peak present in the first heat up scan of the sample.

Example 8: Reaction of Polyester with Unoxol (1:1 Ratio Blend of 1,3 Cyclohexane Dimethanol and 1,4 Cyclohexane Dimethanol Isomers) and Isophthalic Acid Virgin poly(ethylene terephthalate) as supplied by Muehlstein (9.7 g) was added at room temperature to a 100 ml glass reactor. Next, a quantity of 2.8 g terephthalic acid (supplied by Sigma Aldrich), 2.5 g of Unoxol (cyclohexane dimethanol mixed isomers supplied by Dow Chemical), and 0.013 g of antimony trioxide (supplied by Sigma Aldrich) was added to the reactor. The reactor was sealed and purged with nitrogen for approximately 20 minutes. A glass stirrer was used to mix the contents of the reactor via overhead mixing at approximately 160 rpm. The headspace of the reactor was then evacuated to 0 mbar and refilled with nitrogen for three cycles. The contents of the reactor were then gradually heated to 285° C. under nitrogen over a period of approximately 1 hour. The contents were held at 285° C. for an additional 45 minutes. The pressure inside the vessel was then reduced by pulling vacuum, reaching 0 mbar. The reaction was continued at 285 degrees C. for approximately 3.5 hours under vacuum. Volatile species were collected by a short path distillation column and condenser flask which was cooled by dry ice. To stop the reaction, stirring and heating was discontinued and the reactor was purged with nitrogen to return to atmospheric pressure. The contents were cooled down overnight to ambient temperature (nominally 20-25 degrees C.). Final mole % cyclohexane dimethanol (relative to total diol content) was 25%. Final mole % isophthalic acid (relative to total diacid content) was 25%.

DSC was run on the final product before any attempted foaming, showing no presence of crystallinity and a Tg of 72° C.

To assess foamability, a sample was pressed into a film and tested for foamability using the method described above. The sample showed evidence of pore formation, indicating successful foaming. The post-foamed sample was measured for crystallinity using DSC. The first heat up scan was used to determine if any crystallinity was formed. No evidence of crystallization was detected (125° C.-225° C. temperature range).

The molecular weights of the foamable resins are summarized in Table 1.

TABLE 1

| Example # | Mn | Mw | Mz | Mz + 1 |
|---|---|---|---|---|
| 1 | 45 | 24027 | 40810 | 56632 |
| 2 | 251 | 27507 | 46927 | 67766 |
| 3 | 9046 | 41348 | 96452 | 573293 |
| 4 | 9131 | 25250 | 40850 | 57446 |
| 5 | 602 | 11405 | 20650 | 28929 |
| 6 | 7438 | 25062 | 95168 | 3287516 |
| 7 | 7202 | 35446 | 259553 | 3400509 |

Mn is number average molecular weight, Mw is weight average molecular weight and Mz is Z average molecular weight. Mz+1 is a Z+1 average.

We claim:

1. A foamable composition comprising an amorphous polyester or copolyester composition comprising the reaction product of crystalline or semicrystalline polyester or copolyester, optionally derived from a recycled waste stream, at least one diol or aromatic diacid or an ester of a diacid or a hydroxycarboxylic acid or a lactone or a dianhydride, and a catalyst, wherein the amorphous composition has a weight average molecular weight of at least 10,000 g/mol, polystyrene equivalent molecular weight, as measured by gel permeation chromatography, and one or more blowing agents.

2. The foamable composition of claim 1, wherein in the amorphous composition the polyester is polyethylene terephthalate, polyethylene terephthalate glycol, or a polyester where the main diol component is ethylene glycol, propylene glycol, 1,4-butane diol, spiroglycol or blends thereof.

3. The foamable composition of claim 1, wherein in the amorphous composition the at least one aromatic diacid monomer is phthalic acid, terephthalic acid, isophthalic acid, or 2,5-furandicarboxylic acid, or combination thereof.

4. The foamable composition of claim 1, wherein in the amorphous composition the at least one diol is ethylene glycol, 1,2-propylene glycol, 1,3-propylene glycol, butylene glycol, 1,4-butane diol, spiroglycol, isosorbide, cyclohexane dimethanol, or cyclobutane diol, or combination thereof.

5. The foamable composition of claim 1, wherein in the amorphous composition the catalyst is or comprises titanium tetrabutoxide, cerium(III) acetate, tetra isopropyl titanate, antimony trioxide or a tin-based organometallic complex.

6. The foamable composition of claim 1, wherein the amorphous composition has a Tg of at least 75° C.

7. The foamable composition of claim 4 wherein the cyclohexane dimethanol is 1,4-cyclohexane dimethanol present in an amount of from 20 to 40 mol % of total diol content.

8. The foamable composition of claim 4 wherein the isosorbide is present in an amount of from 15 to 100 mol % of total diol content.

9. The foamable composition of claim 4 wherein the cyclobutanediol is 2-2-4-4-tetramethyl-1-3-cyclobutanediol, present in an amount of from 45 to 55 mol % of total diol content.

10. The foamable composition of claim 4 wherein the cyclohexane dimethanol is 1,3-cyclohexane dimethanol, 1,4-cyclohexane dimethanol, or blends thereof, present in an amount of from 20 to 30 mol % when combined with isophthalic acid or terephthalic acid, or blends thereof, present in an amount of from 20 to 30 mol %.

11. The foamable composition of claim 1 wherein the foamable composition is in the form of a solid bead.

12. The foamable composition of claim 1, wherein the blowing agent is selected from one or more pentane hydrocarbon, one or more halogenated hydrocarbon, one or more hydrofluoroolefin, alcohols, ketones, ethers, olefins, carbon dioxide, water, or a combination thereof.

13. A foamed article made by extrusion foaming of the foamable composition of claim 11, or expansion of the solid bead of claim 11 wherein the article has a density no greater than 96 kg/m$^3$ (6 pcf).

14. The foamed article of claim 13 wherein the density is no greater than 80 kg/m$^3$ (5pcf).

15. A method of making an amorphous polyester foamable resin composition comprising the steps of:
combining at room temperature in a reactor, a crystalline or semi-crystalline polyester, optionally derived from a recycled waste stream, with at least one diol or aromatic diacid or an ester of a diacid or a hydroxycarboxylic acid or a lactone or a dianhydride, and in the presence of a catalyst,
sealing and purging the reactor with an inert gas,
mixing the contents,
evacuating the reactor of volatile components,
flushing the reactor at least once with an inert gas,
increasing the temperature of the reactor to between 250-350 degrees C. over a period of from 30 to 90 minutes,
mixing the molten material combination
maintaining a temperature of between 250-350 degrees C. for between 20 to 150 minutes,
evacuating the reactor to minus 25 inches of mercury or lower,
continuing the reaction at a temperature of from 250-350 degrees C. for between 100 to 300 minutes, optionally while removing volatile species via a distillation column, and
stopping the reaction by ceasing mixing, purging the reactor with an inert gas, returning the reactor to atmospheric pressure and reducing the temperature to 100 degrees C. or lower,
wherein the resultant composition has a weight average molecular weight of at least 10,000 g/mol (polystyrene equivalent molecular weight) as measured by gel permeation chromatography) and a degree of crystallinity no greater than 5% as determined by differential scanning calorimetry.

* * * * *